Feb. 8, 1938.  J. W. PEASE  2,107,339
APPLE PARING AND TRIMMING MACHINE
Filed July 28, 1936  3 Sheets-Sheet 1

INVENTOR
John W. Pease
BY
his ATTORNEY

Feb. 8, 1938. J. W. PEASE 2,107,339
APPLE PARING AND TRIMMING MACHINE
Filed July 28, 1936   3 Sheets-Sheet 2

INVENTOR
John W. Pease
BY
his ATTORNEY

Feb. 8, 1938. J. W. PEASE 2,107,339
APPLE PARING AND TRIMMING MACHINE
Filed July 28, 1936   3 Sheets-Sheet 3
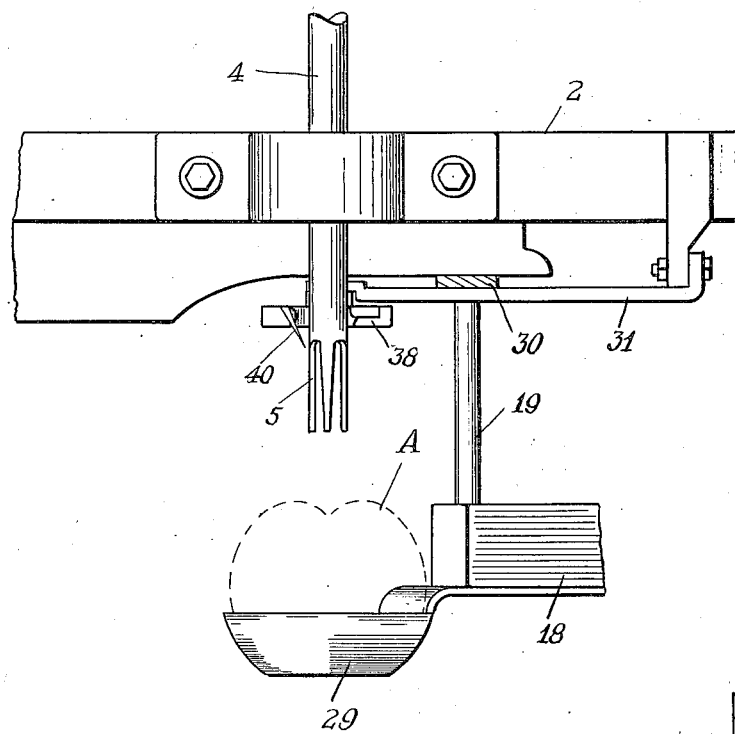
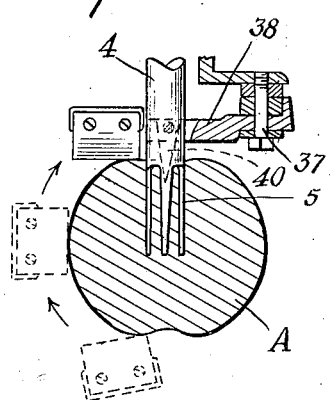
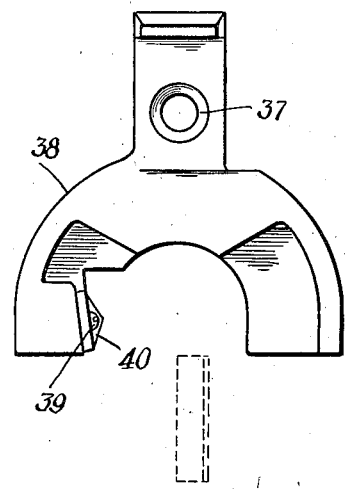
INVENTOR
John W. Pease
BY
his ATTORNEY Patented Feb. 8, 1938

2,107,339

UNITED STATES PATENT OFFICE 2,107,339

APPLE PARING AND TRIMMING MACHINE

John W. Pease, Rochester, N. Y.

Application July 28, 1936, Serial No. 93,068

11 Claims. (Cl. 146—45)

My present invention relates to fruit treating machinery and more particularly to apple paring machines and it has for its object to provide such a machine of the general character of that shown in my prior patent, original No. 1,615,914, dated February 1, 1927, Reissue No. 17,307, dated May 28, 1929, improved, however, to make finer provisions for the accurate and economical removal of the apple skin or that of similar fruit regardless of the size and texture or condition of the individual apples. The improvements are directed in part toward the provision of a knife for trimming an apple in the regions of the ends of the core and toward the paring knife for paring the body of the apple, all in combination with a particular compensating apple support and rotating element.

To these and other ends, the invention resides in certain improvements and combinations of parts, all as will be hereinafter more fully described, the novel features being pointed out in the claims at the end of this specification.

In the drawings:

Fig. 3 is an enlarged fragmentary rear view of the fruit support and adjacent parts including the feeding cup;

Fig. 4 is a detail fragmentary section through the fruit support taken from front to rear and showing the path of the paring knife with reference to an apple held thereon;

Fig. 5 is a further enlarged detail top view of the impaling stop and trimming knife support.

Similar reference numerals throughout the several views indicate the same parts.

To first give a general idea of the objects and mode of operation of the machine, in paring machines of the nature disclosed in my said prior patent and particularly with mechanical feeders for impaling an apple on the fork of the rotating spindle, the problem has always presented itself of adapting a machine to receive properly and to effectively act in the same manner and with the same efficiency indiscriminately upon large and small apples and hard and soft apples. The paring or trimming devices being arranged to operate in a comparatively definite path, it is desirable that the apple always have a definite position on its rotating axis with reference thereto. However, the mechanical feeding device that presents the apple is preferably yielding in character so as not to be harsh in presenting the apple and this with the normal resistance of the fork itself has been relied upon to place the apple only approximately so that it will be firmly held and yet not injured. The result is that hard or firm apples are not impaled far enough on the fork with a given adjustment of the feeding device, whereas soft apples are thrust too far so that they split or are out of position. Great variation obviously results between small soft apples and large hard apples, for instance. The tines of the fork in the ideal presentation of the fruit should be completely buried in the apple core but leave enough solid pulp beyond their tips to give firm resistance to their rotation so that the apple will be carried around with them.

In the practice of my invention, I provide an arrangement whereby, with a tension on the yielding pressure of the feed device (or even a thrust of the hand in hand feeding) adequate to properly impale a small hard apple, a limited yielding of the fork or apple support in connection with a relatively fixed stop results in apples of all conditions and sizes to be impaled to exactly the same extent and to occupy the same position with respect to trimming their upper or inner ends. Hence, the cut of an end trimming knife is always the same and the end of the path of the paring knife always arrives at the same point of any apple.

Figure 2:
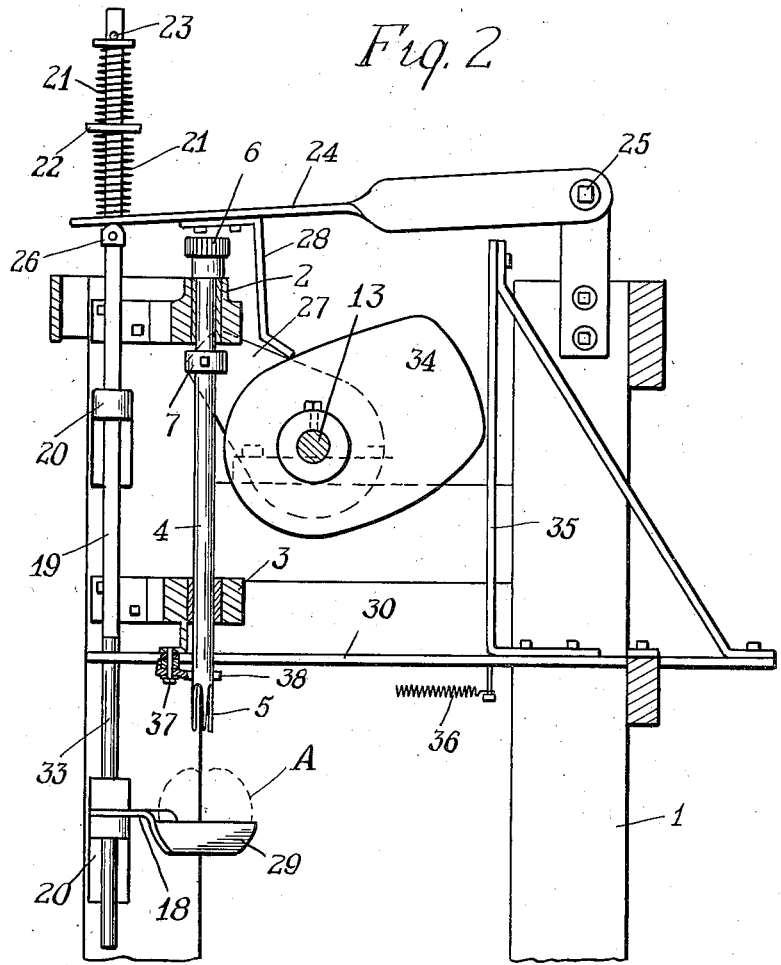
Fig. 2 is a transverse sectional view taken from front to rear approximately through the axis of the fruit support.

Referring more particularly to the drawings in connection with the disclosure of my said prior patent, the driving, feeding, coring and paring devices, their relationship and coordination are substantially the same herein as to construction and general operation, and hence only a sufficient repetitional illustration has been made to establish the requirements of the improvements in which the present invention resides. A frame 1 carries bearings in its top front rail 2 which, together with the bearings in a lower supplemental frame 3, supports a spindle 4 terminating at its lower end in an apple supporting fork 5, thus arranged to turn and rotate an impaled apple on a vertical axis. The upper projecting end of the spindle terminates in a pinion 6, the hub of which rests on the frame piece 2 and limits downward axial movement thereof. The spindle is permitted limited upward axial movement through the location thereon of an adjustable stop collar 7 normally spaced from the rail, as shown in Fig. 2 and which will be later referred to and explained. The pinion 6 is in constant mesh with a drive gear 8 on a parallel vertical stud 9 on the frame and this gear, through a companion relatively fixed bevel gear 10, is driven by a cycle member 11 on a countershaft 12 running from front to rear. This countershaft is suitably geared to the main driving shaft 13, shown in section in Fig. 2. The cycle member 11 actuates in timed relation the usual carriage 3ª on the supplementary frame 3 on which carriage are mounted the swinging coring spoon 14, a relatively fixed doffer 15, with which it cooperates in its swinging movement and the spring pressed swinging arm 16 carrying the paring knife blade 17. Those familiar with the art will understand the sequence of operation of these devices, namely, that after an apple, indicated at A, is impaled upon the fork 5 and the feeding device withdraws, the corer 14 upon the rising of carriage 3ª and through the employment of suitable cams (not shown herein), swings up into axial alinement, enters the apple with the reciprocation of the carriage 3ª and removes the core, finally bringing the apple down with it and doffing it at 15, while in the meantime the knife 17 removes the peeling, taking a semi-circular course, as shown in Fig. 4, with regard to which path of cutting contact the axis of the fork and spindle constitutes a chord.

The feeding mechanism, as in the patented invention, embodies an arm 18 on a vertically reciprocatable rod 19 sliding in brackets 20 on the frame 1. Its upper projecting end is provided with two springs 21 separated by an intermediate washer 22 and the top one abutting the stop 23 on the rod. The lower end of the lower one rests against a rock arm 24 pivoted to the frame at 25 at the rear and engaging between the spring and a lower abutment 26 on the rod 19. The cam 27 on the main driving shaft 13 engages a bracket arm 28 on the rock arm 24 and lifts it at the proper time, as in Fig. 2, to raise an apple A placed in the cup 29 of feed arm 18 and impale it upon the fork 5. In doing so, the rock arm 24 acts through the springs 21 so that the feeding cup yieldingly presses the apple upon the fork. This yielding feeding and impaling movement can be regulated as to its force by the provision of interchangeable springs of different flexibilities or otherwise, but, as before stated, for the requirements of the present invention, it is made strong enough to provide the maximum travel and overcome the maximum resistance of a small hard apple though yielding to a greater extent for a large apple.

When the return movement imparted to the feeding arm 18 carries it down to the position of Fig. 2, it is given a swinging movement on the rod 19 as a center outwardly in front of the machine for the convenience of the operator in placing, stem up, the succeeding apple in the cup 29. This is accomplished by a carriage including a horizontally reciprocatable draw bar 30 guided in the rear of the frame and between the cross piece 3 at the front thereof and a bracket 31 bolted to this cross piece, as shown also in Fig. 3, which draw bar is equipped with a bearing hub 32 at the front slidably engaging a post 33 on the feed arm so that the latter can reciprocate with the rod 19, as described, without losing its connection. When the high point of the cam 34 on the main driving shaft 13 engages an upright bracket 35 on the draw bar 30, the latter swings the feed arm into alinement with the fork and below it for the impalement first described, as shown in Fig. 2. A spring 36 connected to the draw bar or carriage and to a fixed part of the frame holds the upright 35 against the cam and when the low point thereof is reached, this spring swings the feed arm out to the receiving position stated.

Figure 1:
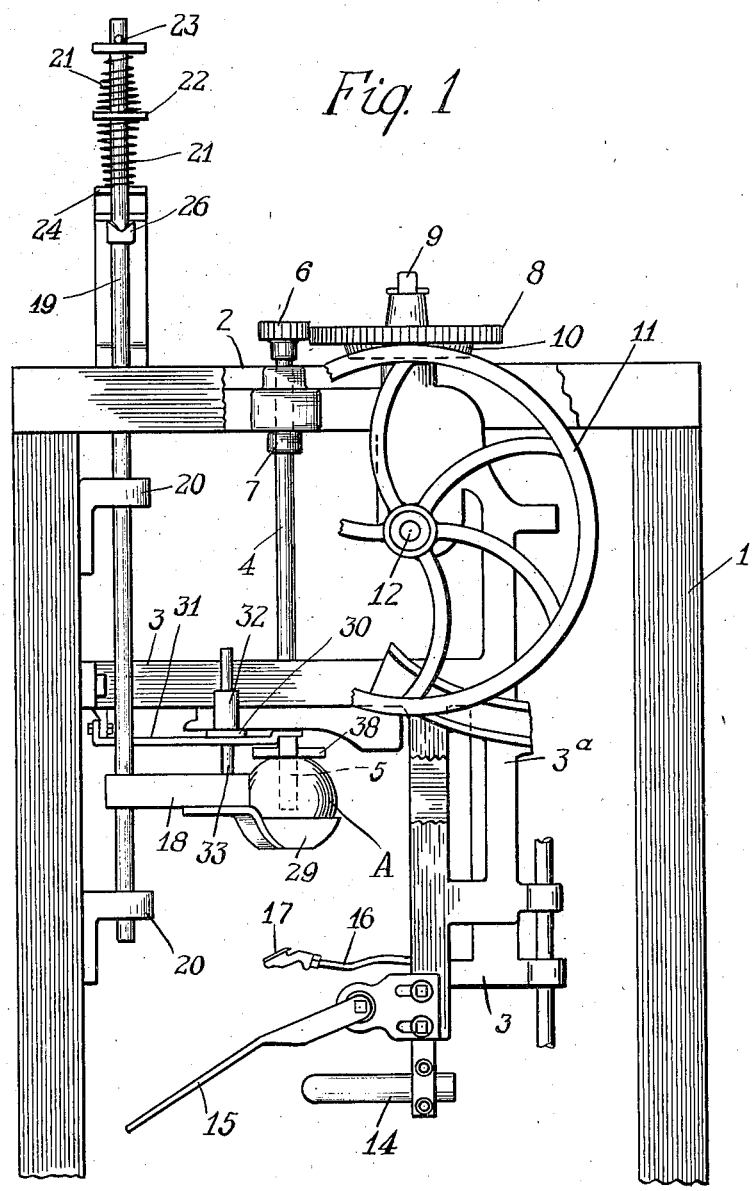
Fig. 1 is a front view, including only the upper portion of the frame of a paring machine constructed in accordance with and illustrating one embodiment of my invention, with the parts in a position in which the feed device has just completed the presentation of an indicated fruit to the supporting device, rearwardly arranged operating mechanism being omitted.
Figure 6:
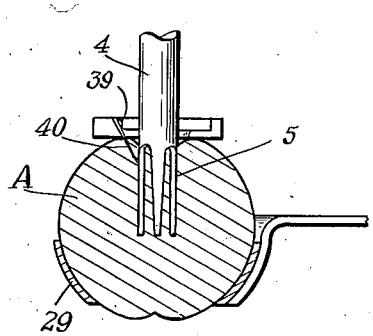
Figs. 6 and 7 are detail views illustrating the action of the fruit support in receiving the fruit and the action of the trimming knife in operating thereon.
Figure 7:
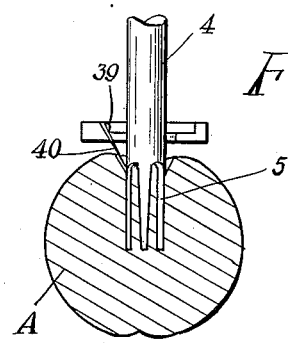

Bolted to the bracket 31 at 37 is a small casting constituting a yoke 38 shown in detail in Fig. 5. On the inner side of one of its arms this yoke carries and has secured to it by a screw 39 the downwardly projecting and somewhat inwardly inclined blade 40 of a knife for trimming the depression in the end of the apple adjacent to the core which the paring knife 17 cannot quite reach and in which depression or dimple a more or less narrow ring of skin is ordinarily left and later trimmed out by hand. The tip of this trimming blade is normally in the region of the bases of the tines of the supporting fork 5, as shown in Figs. 3 and 7. The upward sliding movement of the spindle and fork first described and defined by the adjustable collar stop 7 is just sufficient to carry these tine bases up to approximately the level of the fixed stop 38. The said bases of the tines further offer a final resistance to the impalement of the apple and a resistance sufficient to cause the feeding device to lift the spindle 4, apple and all, until from the positions of Figs. 2 and 3 the end of the apple positively abuts the fixed stop yoke 38 when the stop collar 7 engages the cross piece 2 of the frame, as shown in Figs. 1 and 6. In any event, the apple is fully impaled but can travel no farther than the stop 38 whether with the spindle or relatively to it and its fork. The apple, regardless of its size or condition, is halted against this stop 30 in definite and uniform relationship to the fork and to the trimming knife 40, any further movements of the feeding mechanism being idle and absorbed by the yielding of the springs 21.

When the feeding device drops back as to the position of Figs. 2 and 3, the spindle 4 and fork 5 with the apple on the latter return to normal position, dropping thereto by gravity, in the present instance, through their inherent weight and that of associated parts and the top of the apple, whatever its size, is spaced from the stop to the extent indicated in Figs. 4 and 7. At this point the trimming blade 40, which has made a small dent in the apple in the position of Fig. 5, is still sufficiently buried in the pulp to peel and yet not so deeply as to hog it but merely remove the ring otherwise left by the paring knife aforesaid.

Up to this point of the return of the feeding device and the spindle, the latter, of course, has been at rest rotatably but immediately thereafter the cycle member 11 in the manner set forth in my said prior patent effects the rotation of the spindle so that the apple is quickly cored, pared and trimmed.

The work of the paring knife 17 is also facilitated. It is not interfered with, as indicated in Figs. 4 and 5, by the stop yoke 38 because it operates opposite the open end thereof travelling through the path indicated consecutively by the dotted and full line positions appearing in the former figure. With this arc of movement adjusted with relation to the base of the fork tines with relation to which the base the end of the apple has been shown to always be uniform, the paring knife is enabled to go far in radially to the full line position of Fig. 4. With the approximate adjustments heretofore practiced, where the position of the apple on the fork varied, there was the result that the paring knife arm, given such a tension as would contact a small apple, would hog a big one or else not get all the way around the larger surface arc presented by it.

Another thing to be noted is that while it would appear that the initial contact of the paring knife with the lower or bud end of the apple (represented by the lower dotted line position in Fig. 4) would tend to carry it upward along with the fork and spindle, as does the feeding or presenting device, it must be remembered that the driving gear 8 against which the pinion 6 has been slipped but never lost meshing contact is rotating the spindle and the apple before the paring knife goes into action. The resistance of this drive at the mesh is too great for the knife to overcome and hence the spindle does not rise and the apple remains spaced from the stop 38.

I claim as my invention:

1. In an apple trimming machine, the combination with a rotatable spindle having apple supporting means thereon capable of a yielding axial movement but returnable automatically to initial normal position, of a stop associated with the supporting means but independent thereof and adapted to control the degree of application of an apple to the supporting means, and a knife adapted to engage an apple on the support when the latter yields and to trim it at one end of its core when the support returns.

2. In an apple trimming machine, the combination with a rotatable spindle having apple supporting means thereon capable of a yielding axial movement but returnable automatically to initial normal position, of a stop associated with the supporting means but independent thereof and adapted to control the degree of application of an apple to the supporting means, and a trimming knife fixed with relation to the stop and adapted to engage an apple on the support when the latter yields and to trim it at one end of its core when the support returns.

3. In an apple trimming machine, the combination with a rotatable spindle having apple supporting means thereon capable of a yielding axial movement but returnable automatically to initial normal position and a spring-pressed reciprocatory feeding device movable along the axis of the spindle and supporting means to present an apple thereto and then return, of a stop associated with the supporting means but independent thereof and adapted to control the degree of application of an apple to the supporting means by the feeding device, a knife, fixed with relation to the stop and adapted to engage an apple on the support when the latter yields and to trim it, at one end of its core, and correlated driving means for the spindle and feeding device operative upon the former only after its return and the return of the feeding device.

4. In an apple trimming machine, the combination with a rotatable spindle capable of a yielding axial movement but returnable automatically to initial normal position and terminating in an apple supporting fork, of a stop associated with the fork but independent thereof and adapted to control the degree of impalement of an apple thereon, and a trimming knife fixed with relation to the stop and adapted to engage an apple on the support when the latter yields and to trim it at one end of its core when the support returns.

5. In an apple trimming machine, the combination with a rotatable spindle capable of a yielding axial movement but returnable automatically to initial normal position and terminating in an apple supporting fork, of a stop associated with the fork but independent thereof and adapted to control the degree of impalement of an apple thereon, and a trimming knife fixed with relation to the stop and adapted to engage an apple on the fork when the latter yields and to trim it at one end of its core when the fork returns, the bases of the tines of the fork being normally advanced beyond the stop and constituting means tending to retard impalement of the apple thereon.

6. In an apple trimming machine, the combination with a rotatable spindle capable of a yielding axial movement but returnable automatically to initial normal position and terminating in an apple supporting fork, of a stop associated with the fork but independent thereof and adapted to control the degree of impalement of an apple thereon, and a trimming knife fixed with relation to the stop and adapted to engage an apple on the fork when the latter yields and to trim it at one end of its core when the fork returns, the bases of the tines of the fork being normally advanced beyond the stop and constituting means tending to retard impalement of the apple thereon, and the knife being disposed so that its tip is adjacent to such bases in that advanced position.

7. In an apple trimming machine, the combination with a frame and a vertically disposed rotatable spindle having bearings therein and provided with apple supporting means thereon capable of a yielding axial movement but returnable automatically to initial normal position, of a yoke secured to the frame and partially surrounding the spindle to provide a stop independent of the latter and adapted to control the degree of application of an apple to the supporting means, and a trimming knife mounted on the yoke adapted to engage an apple on the support when the latter yields and to trim the apple at one end of its core when the support returns.

8. In an apple trimming machine, the combination with a frame, a drive gear mounted thereon, a vertically disposed rotatable spindle having bearings therein in which the spindle may slidably yield upwardly and restore itself automatically to initial normal position, stops limiting such movements and a pinion on the spindle slidably but constantly meshing with the drive gear within the limits provided by the stops, said spindle having an apple supporting fork at its lower end, of a stop on the frame associated with the fork but independent thereof and adapted to control the degree of impalement of an apple thereon, and a trimming knife fixed with relation to the stop and adapted to engage an apple on the fork when the spindle yields upwardly and to trim it at one end of its core when the fork returns.

9. In an apple trimming machine, the combination with a frame, a drive gear mounted thereon, a vertically disposed rotatable spindle having bearings therein in which the spindle may slidably yield upwardly and restore itself automatically to initial normal position, stops limiting such movements and a pinion on the spindle slidably but constantly meshing with the drive gear within the limits provided by the stops, said spindle having an apple supporting fork at its lower end, of a stop on the frame associated with the fork but independent thereof and adapted to control the degree of impalement of an apple thereon, a paring knife adapted to cooperate with the fork and having a semi-circular path with relation to which the turning axis of the fork constitutes a chord, a reciprocatory feeding device movable along the axis of the fork to present an apple thereto and then return, and correlated driving mechanism for the driving gear, feeding device and knife which actuates the knife only after the return movement of both the fork and feeding device.

10. In an apple trimming machine, the combination with a frame and a vertically disposed rotatable spindle having bearings therein and provided with apple supporting means thereon capable of a yielding axial movement but returnable automatically to initial normal position, of a yoke secured to the frame and partially surrounding the spindle to provide a stop independent of the latter and adapted to control the degree of application of an apple to the supporting means, and a paring knife adapted to cooperate with the fork at the open side of the yoke and having a semi-circular path with relation to which the turning axis of the spindle constitutes a chord, and means for operating the fork upon the return of the apple supporting means.

11. In an apple trimming machine, the combination with a frame, a vertically disposed rotatable spindle having bearings therein in which the spindle may slidably yield upwardly and restore itself automatically to initial normal position, and stops limiting such movements, said spindle having an apple supporting fork at its lower end, of a stop on the frame associated with the fork but independent thereof and adapted to control the degree of impalement of an apple thereon, a paring knife adapted to cooperate with the fork and having a semi-circular path with relation to which the turning axis of the fork constitutes a chord, a reciprocatory feeding device movable along the axis of the fork to present an apple thereto and then return, and correlated driving mechanism for the spindle, feeding device and knife which actuates the knife only after the return movement of both the fork and feeding device.

JOHN W. PEASE.